Figure 1:
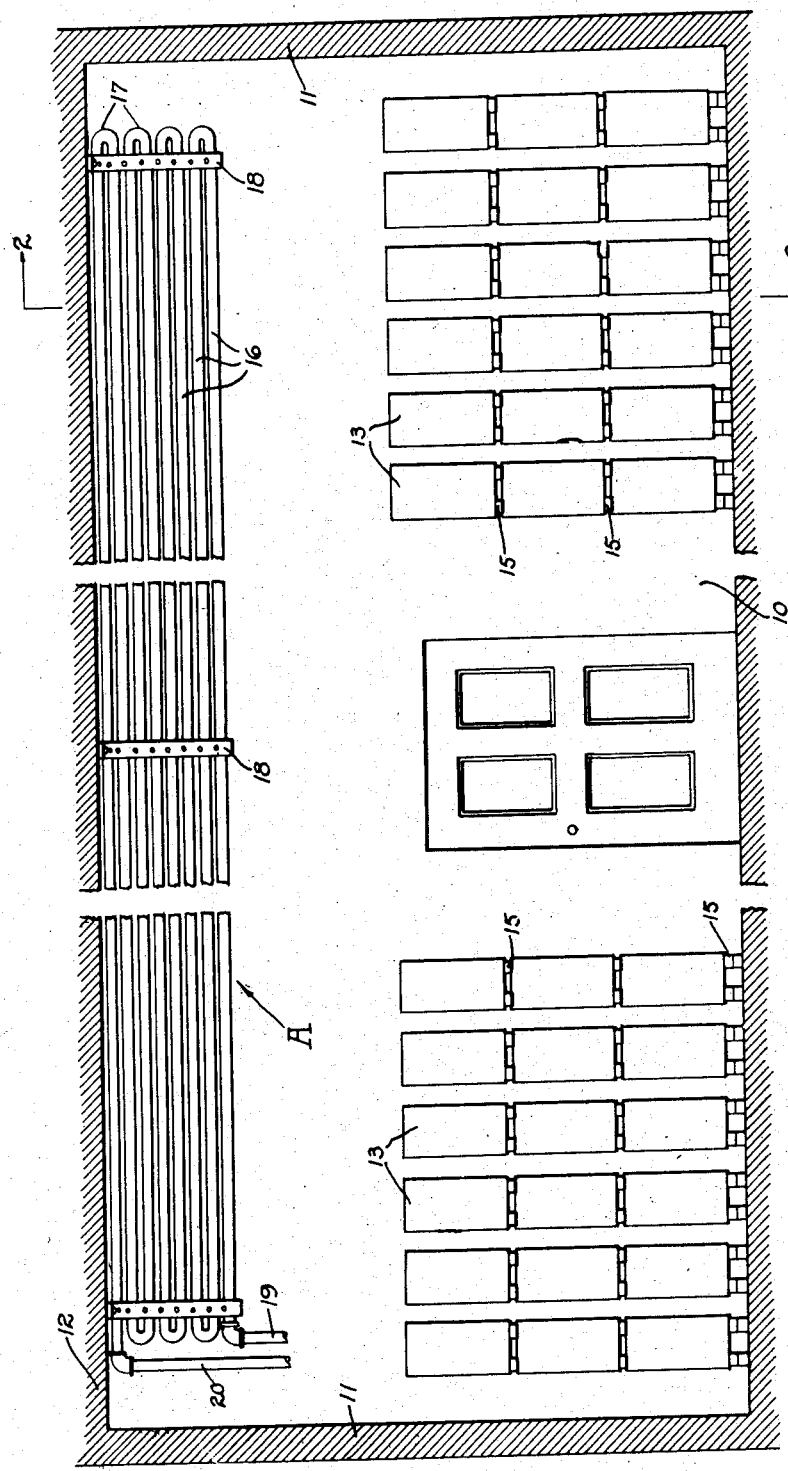

July 7, 1931. C. A. MOORE 1,813,187
MEANS FOR REFRIGERATING AND CONTROLLING THE
CIRCULATION OF AIR IN COLD STORAGE ROOMS
Filed Jan. 23, 1929 7 Sheets-Sheet 1

Inventor
Charles A. Moore
By Caswell + Lagaard
Attorneys

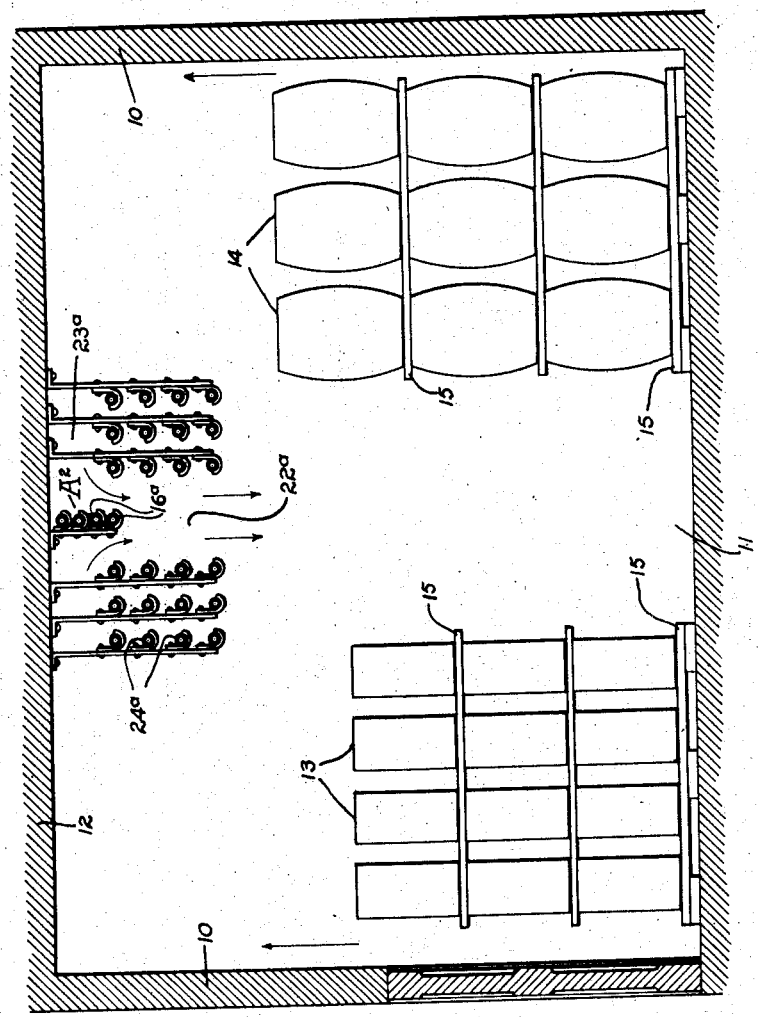

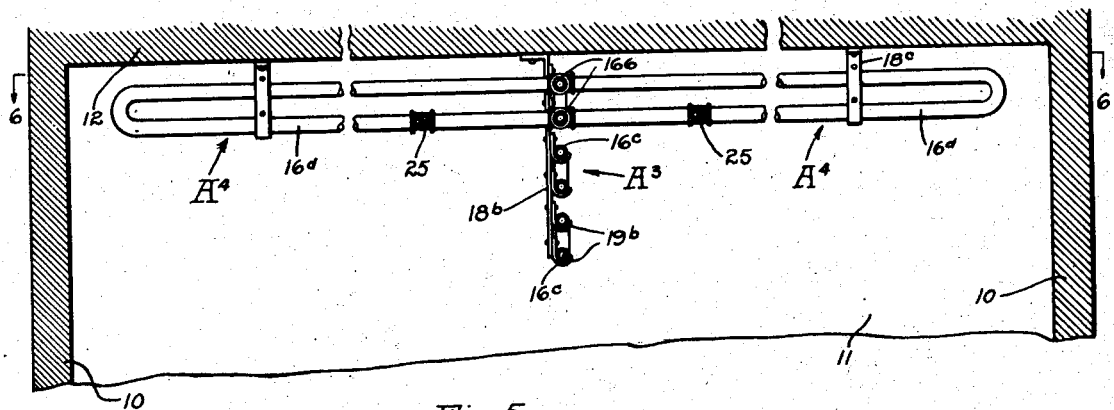
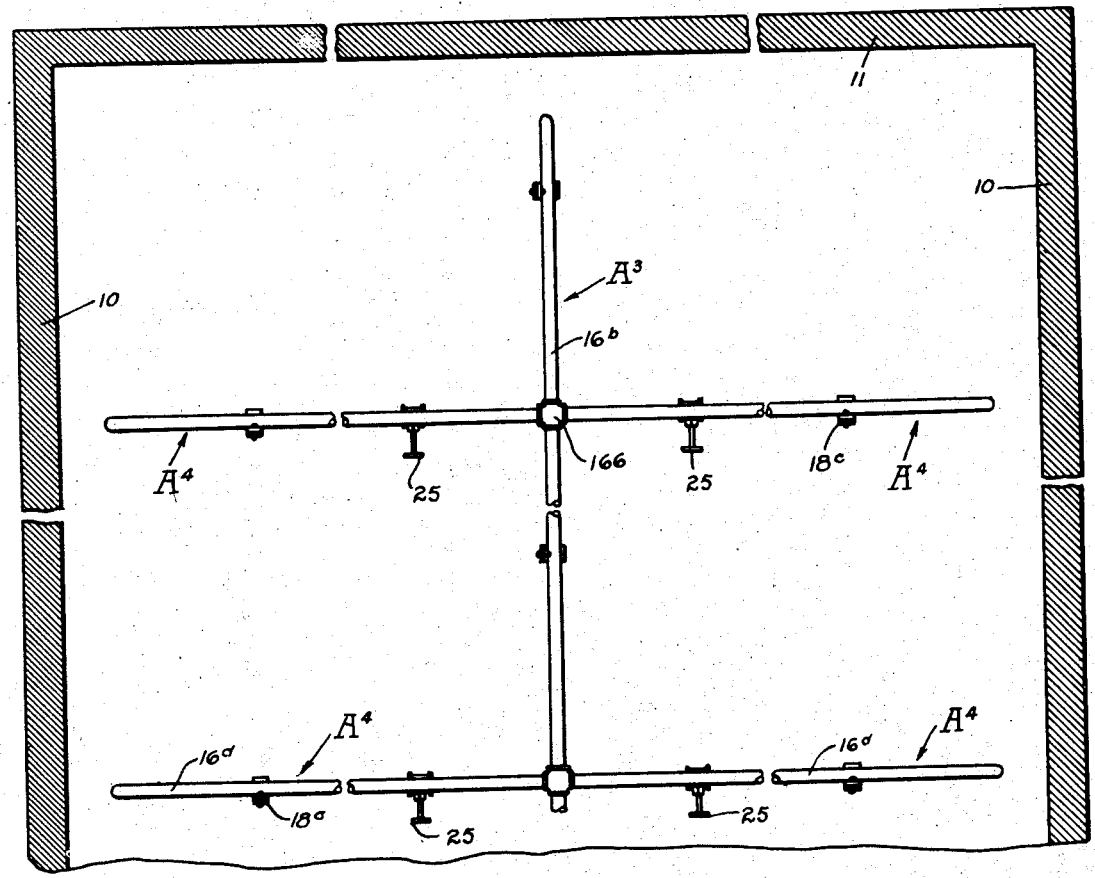

Inventor
Charles A. Moore
By Caswell & Lagaard
Attorneys

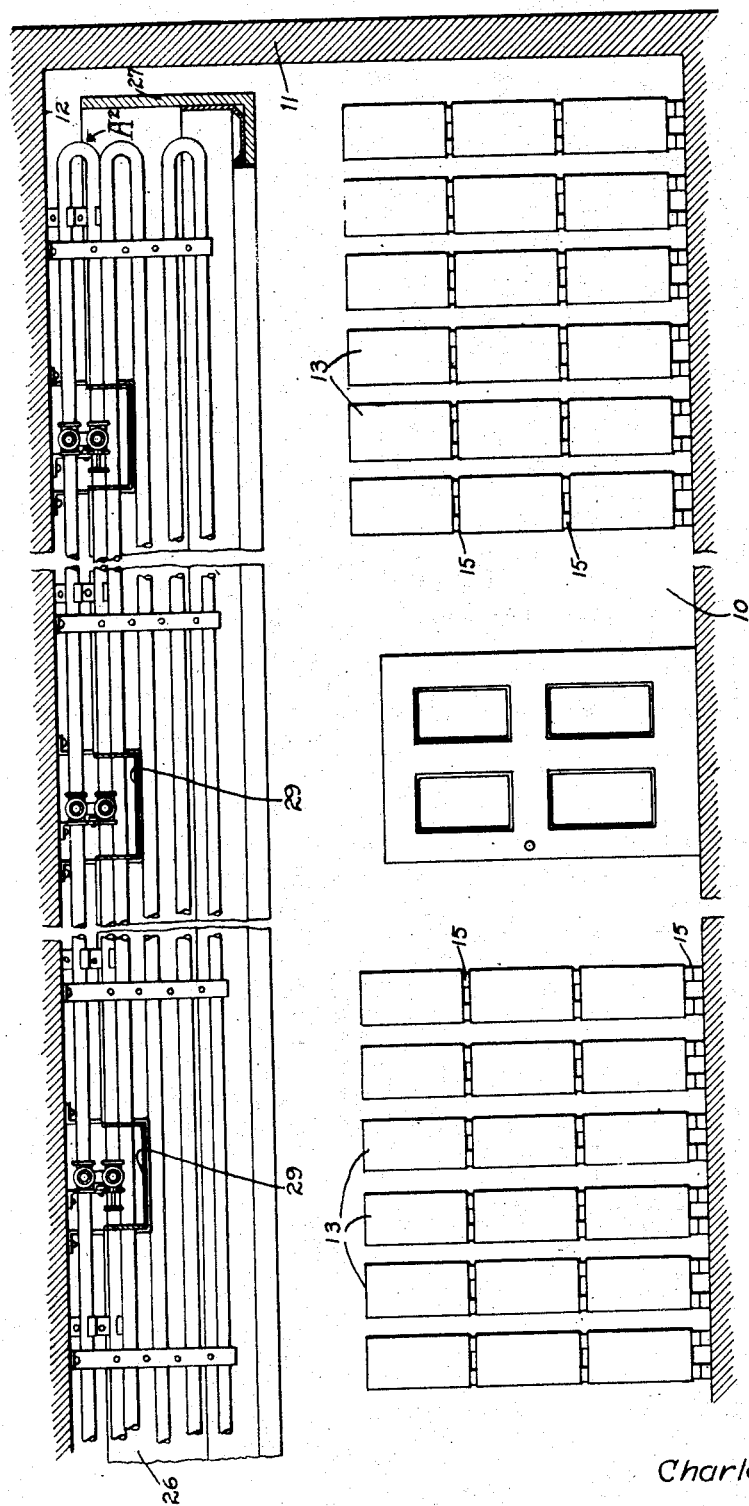

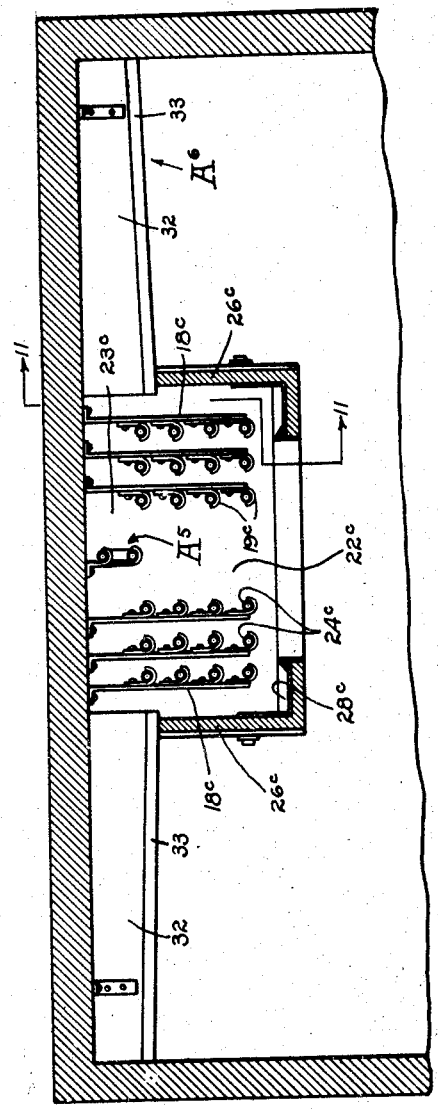
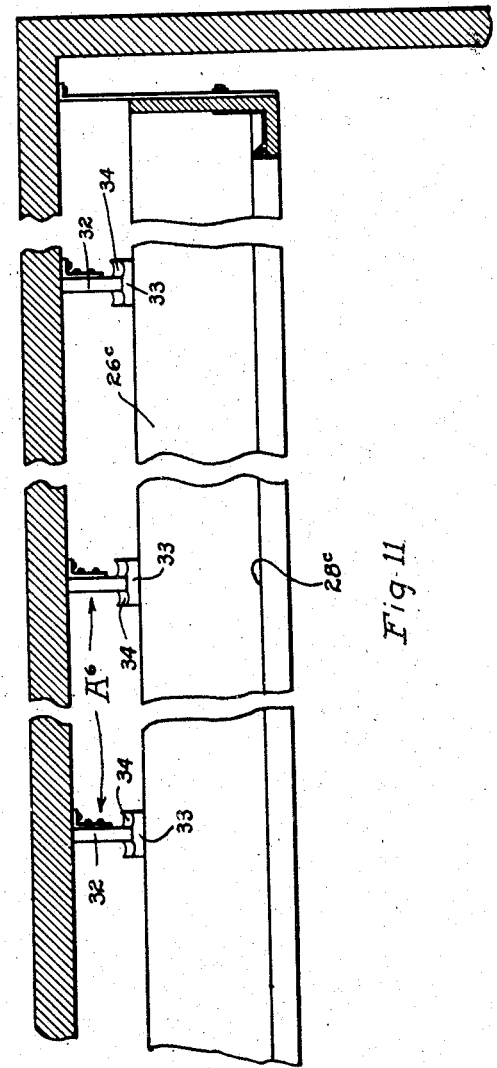

Patented July 7, 1931

1,813,187

UNITED STATES PATENT OFFICE

CHARLES A. MOORE, OF EDINA, MINNESOTA

MEANS FOR REFRIGERATING AND CONTROLLING THE CIRCULATION OF AIR IN COLD STORAGE ROOMS

Application filed January 23, 1929. Serial No. 334,511.

My invention relates to improvements in means for refrigerating and controlling the circulation of air in cold storage rooms.

It has been my practice in equipping a room for cold storage purposes to arrange over a longitudinally central aisle therein banks of refrigerating coils spaced from each other and from the ceiling for refrigerating the air in the room and causing the same to be circulated by gravity in a convective and diffused manner, wherein the air descends from the coils, thence divides and flows toward the opposite side walls, thence rises along the relatively warm walls, thence moves inwardly along the ceiling to a position above the coils, and thence descends through the coils to complete the cycle. This circulation of the air continues normally but may be disturbed more or less when a substantial quantity of goods of low temperature in the lading space is removed and other goods of relatively high temperature stored in the place thereof. In other words, the normally existing "balance" is thus affected with the undesirable result that a part of the warm air of relatively high humidity at the ceiling has a tendency, in moving laterally of the room, to pass the coils in the space between them and the ceiling and descend upon goods of relatively low temperature at the side of the aisle opposite the quantity of newly stored produce. Thus, instead of descending through the refrigerating coils and being subjected to the dehumidifying effect thereof, a part of the warm humid air from the fresh goods finds its way across the aisle to goods of lower temperature, causing condensation to accumulate thereon. A further undesirable result of affecting such "balance" in a cold storage room is found in the tendency of a part of the warm humid air above the newly deposited load to descend upon the adjacent piles of refrigerated goods instead of following the ceiling to a point over the refrigerating coils and then descending at the aisle. These results, of course, are detrimental and properly should be avoided.

An object of my invention is to provide simple and effective means in a cold storage room for overcoming the disadvantages above noted. Otherwise stated, it is an object of my invention to provide simple and effective means for refrigerating the air in a cold storage room and causing it to continue to circulate, as under normal conditions, in a natural convective and diffused manner, when fresh quantities of goods of relatively high temperature are intermingled with previously stored refrigerated goods.

A further object of the invention is to supply in a room an air circulating and temperature affecting element depending from the ceiling and defined bays in the room, such element providing a baffle in the upper portion of the room and serving to isolate the circulaitng air in the different bays, one from the other.

Another object of the invention resides in the association of a ceiling baffle with a temperature affecting element, whereby the air circulating within the various bays defined by said baffle will be confined to their respective bays.

With the foregoing and other objects in view, which will appear in the following description, the invention resides in the novel combination and arrangement of parts and in the details of construction hereinafter described and claimed.

Figure 3:
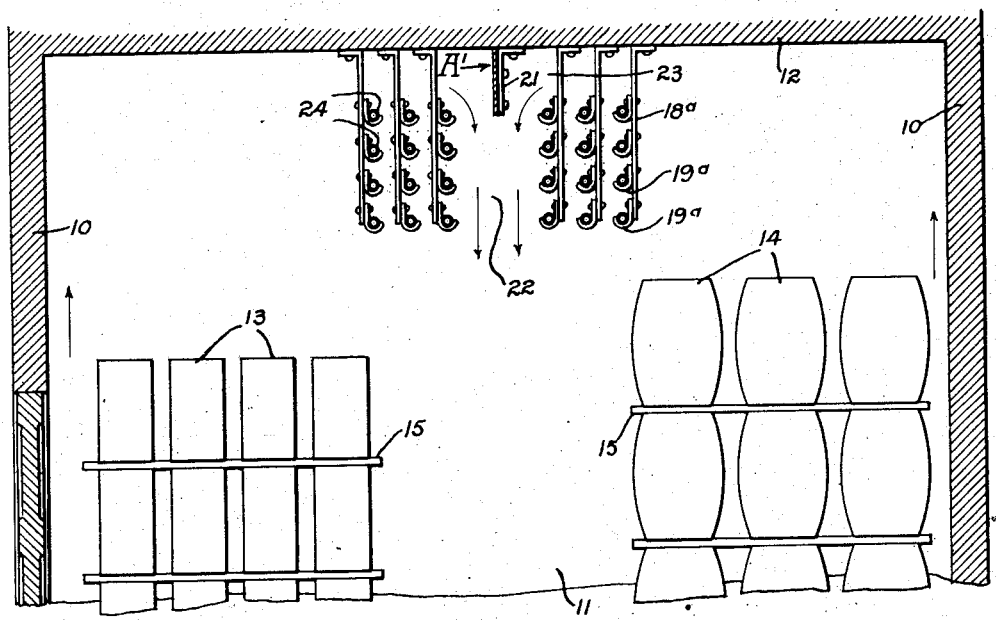
Figure 2:
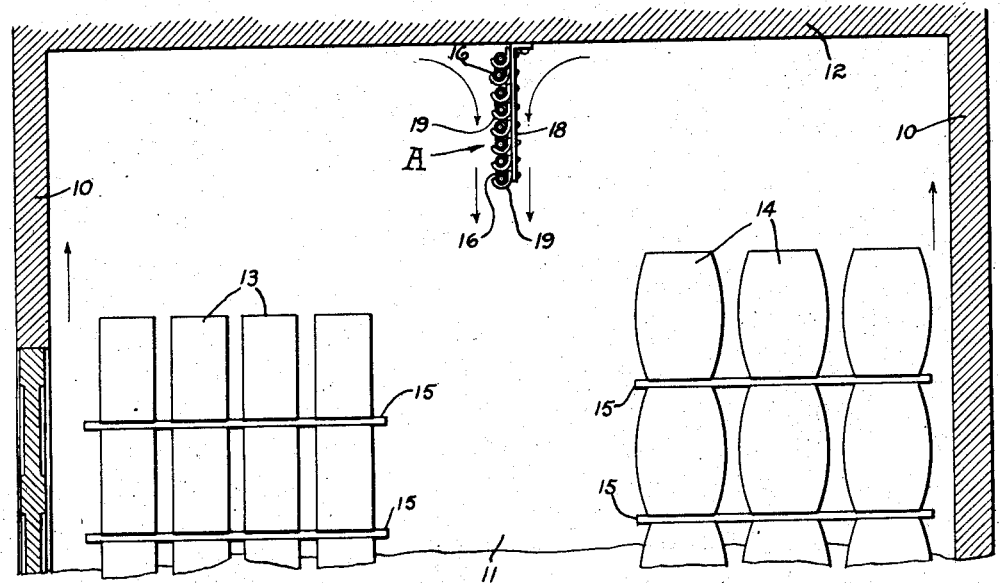
Figure 7:
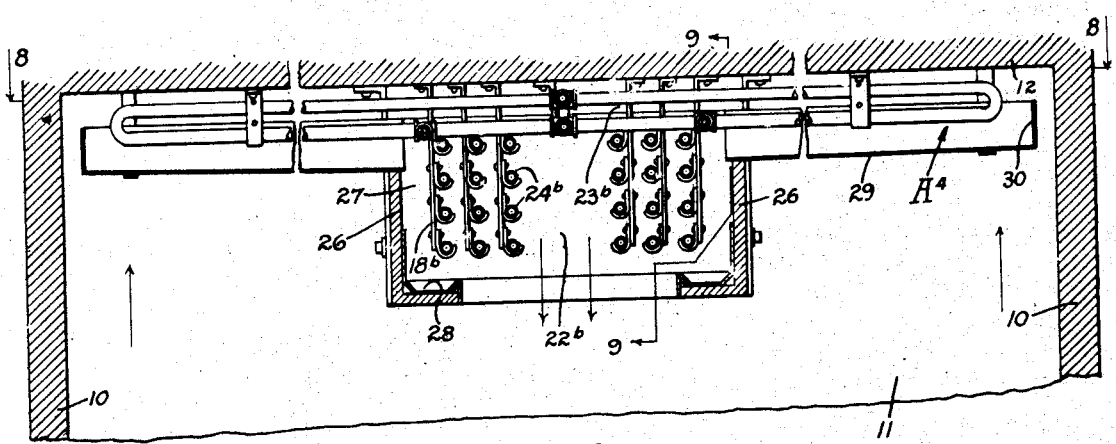
Figure 8:
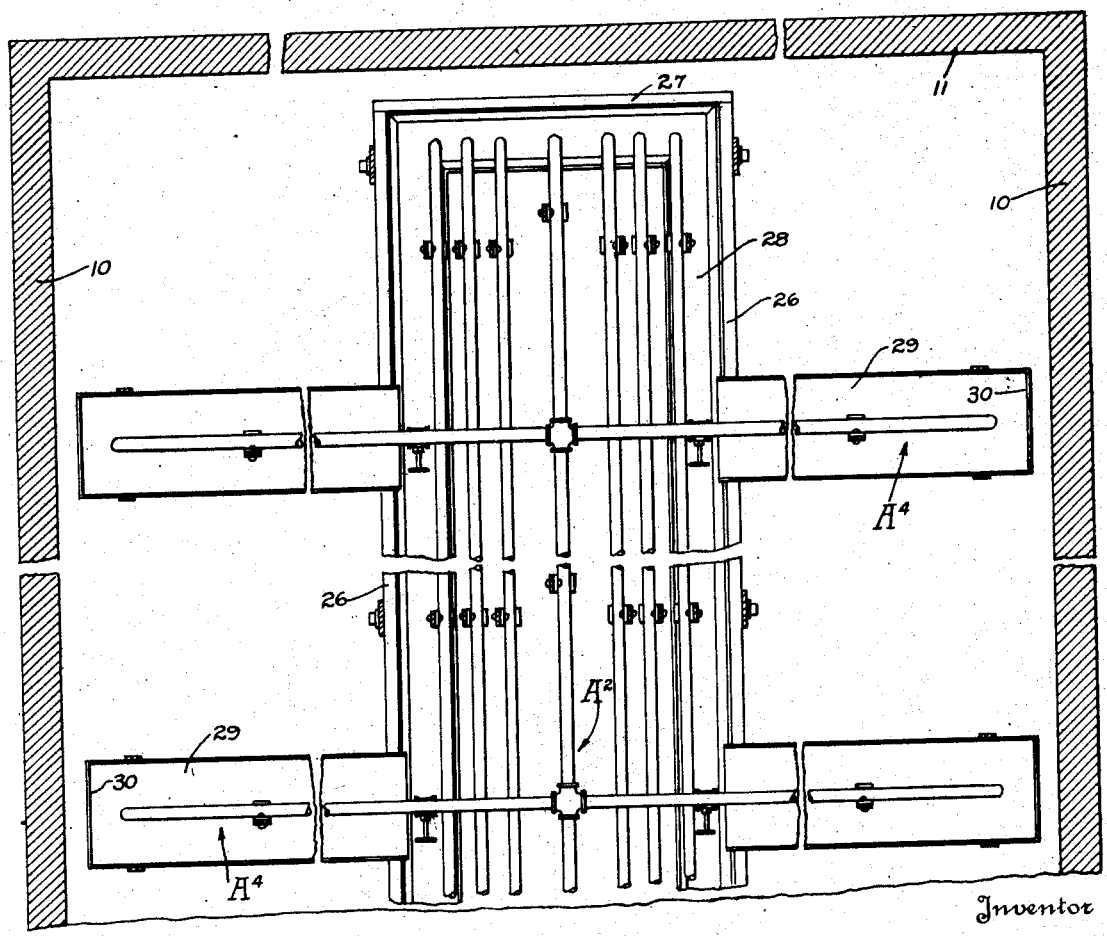

In the drawings, Fig. 1 is a view illustrating an embodiment of my invention in means for refrigerating and controlling the circulation of air in a cold storage room, the view showing a refrigerating room in longitudinal section and a ceiling baffle, in elevation, constituting air refrigerating and circulating means; Fig. 2 is a transverse sectional view taken as on the line 2—2 of Fig. 1; Fig. 3 is a view similar to Fig. 2 illustrating a modified embodiment of my invention; Fig. 4 is a view somewhat like Fig. 3 showing another modification of my invention; Fig. 5 is a view fragmentarily illustrating in transverse section the upper portion of a room in which is applied an embodiment of my invention, including longitudinal and lateral ceiling baffles, constituting means for refrigerating and controlling the circulation of air in the room; Fig. 6 is a horizontal sectional view taken as on the line 6—6 of Fig. 5; Fig. 7 is a fragmentary vertical sectional view of the upper portion of a room showing an embodiment of my invention installed therein; Fig. 8 is a horizontal sectional view taken as on the line 8—8 of Fig. 7; Fig. 9 is a vertical sectional view taken as on the line 9—9 of Fig. 7; Fig. 10 is a vertical sectional view showing the upper portion of a room and a modified form of equipment therein constituting an embodiment of my invention, and Fig. 11 is a sectional view taken as on the line 11—11 of Fig. 10.

In the drawings I have illustrated refrigerating rooms having sidewalls 10, end walls 11 and ceiling 12. These rooms are in conventional form, being elongated in accordance with the usual practice in cold storage plants and so proportioned in transverse section as to provide storage space at either side of a central aisle in which the trucking is accomplished in bringing lading into a room and removing the same therefrom. In storing this lading, in accordance with the usual practice, the boxes or crates as at 13 and the barrels, as at 14, are piled or stacked at either side of the aisle, dunnage strips, as at 15, being placed between the floor and boxes and barrels and between the boxes and barrels themselves to provide air passageways through the stacks of lading and about the individual containers.

In the embodiment of my invention shown in Figs. 1 and 2, it will be seen that I provide a baffle A depending from the ceiling and occupying position overhead above the central longitudinal trucking aisle. In this form of my invention the baffle consists of a pipe 16 turned upon itself in hairpin bends as at 17, the different reaches of the pipe 16 being positioned one beneath the other and the assembly supported from the ceiling by means of hanger straps 18 fitted with hooks 19 adapted to receive and carry the various reaches of the pipe. The lower reach of pipe 16 is connected with a pipe 19 for conducting a refrigerating medium into the baffle assembly, while the upper reach of said pipe 16 is connected with a return pipe 20 for returning the refrigerating medium to the source of supply, not shown. When the reaches of the pipe 16 become frosted, a substantially solid baffle is provided by reason of the near proximity of said reaches of pipe with respect to each other and the near proximity of the upper reach of said pipe with respect to the ceiling 12. The circulation of air in the room (Fig. 2) is shown in a general way by arrows. The air at the ceiling about the baffle A being refrigerated, descends by gravity and seeks a lower elevation, thence passes toward the sidewalls 10, principally at the lower portion of the room, thence rises along the relatively warm sidewalls 10 and thence returns from either side of the room along the ceiling 12 into the proximity of the baffle A, thus completing the cycle. This movement of air, as will be readily comprehended, is in two circuits, one circuit being in one bay and the other in another of the two bays, defined by the baffle A. These well defined air circulating circuits are substantially isolated one from the other, not only under normal operating conditions, but also in the event that a substantial quantity of refrigerated goods is removed from the room and a fresh relatively warm quantity of merchandise substituted therefor. The reason for this resides in the fact that the air refrigerating means in the form of the depending baffle A at the ceiling prevents the inwardly moving air above the piles of lading at either side of the room from passing along the ceiling to the other side of the room and descending upon the merchandise there situated. By this arrangement, the warmest air of greatest relative humidity at the ceiling is definitely subjected to the refrigerating and dehumidifying effect of the refrigerating means, which means in its particular form and location provides a baffle serving effectively to isolate the circuits of circulating air in the respective bays of the room at opposite sides thereof.

In the form of my invention shown in Fig. 3, I have illustrated a baffle A' which depends from the ceiling 12 of the room in the same relative position as the baffle A referred to in the foregoing description of the embodiment shown in Figs. 1 and 2. This baffle A' is of sheet metal or other suitable material, being supported by hangers 21 secured to the ceiling 12, the upper edge of said baffle meeting the ceiling, as shown. In this form, the baffle per se does not constitute refrigerating means, such means being provided in the form of banks of coils of pipe 24 similar in form and in manner of suspension to the reaches of the pipe 16 shown in Figs. 1 and 2, hangers 18ᵃ with hooks 19ᵃ thereon being provided to support the pipe reaches, as explained in connection with Figs. 1 and 2. The tiers of pipe coils are grouped, three in a group, one group being spaced from the other to provide a central port 22 between them, both groups being spaced from the ceiling 12 to provide a passageway 23 between the tiers of pipes and the ceiling. Said baffle A' occupies a position in this passageway 23 in a vertical plane medially of the central port 22 between said grouped tiers of pipes. This baffle A', like the baffle A shown in Figs. 1 and 2, defines bays in which the respective circuits are substantially isolated and serves to stop and deflect downwardly the inwardly moving warm air of relatively high humidity at the ceiling, whereby such air is subjected to the refrigerating and dehumidifying effect of the refrigerating pipes 24 and propelled downwardly thereby rather than crossing the center of the room and descending upon the refrigerated lading at the other side thereof.

In the form of my invention shown in Fig. 4, the construction of the means for refrigerating and controlling the circulation of air in the room is identical with that shown in Fig. 3, except that the baffle $A^2$ shown in Fig. 4 consists of reaches of pipe $16^a$ similar to the construction shown in Figs. 1 and 2. The operation in this form of my invention is the same as that explained in connection with the form shown in Fig. 3, except for a slight difference residing in an enhanced effect due to the fact that the baffle per se constitutes a refrigerating element. In other words, it can readily be seen that the baffle $A^2$, being constituted of refrigerating pipes, the descent of the air at the aisle will be promoted and a more intimate contact between the warm air of relatively high humidity with a refrigerating element will be afforded.

In the form of my invention shown in Figs. 5 and 6, the baffle $A^3$ is similar in construction and arrangement to the baffle shown in Figs. 1 and 2. In this instance the baffle $A^3$ consists of six pipes arranged one above another and supported from the ceiling by hangers $18^b$ equipped with hooks $19^b$ in which the pipes are carried. The two uppermost pipes $16^b$ are connected with a source of refrigerant supply through a valved feed pipe and a valved return pipe, such feed and return pipes, as well as the source of refrigerant supply, not being shown in the drawings. The four pipes $16^c$ at the bottom of the tier and constituting the lower portion of the baffle $A^3$, are connected with each other and with the source of refrigerant supply through suitable valved feed and return pipes not shown. In additon to the central longitudinal baffle $A^3$, the form of invention shown in Figs. 5 and 6 embodies a number of lateral baffles $A^4$ spaced apart, between the ends of the room. Each of these lateral baffles $A^4$ consists of a pipe $16^d$ bent upon itself to form upper and lower reaches, the lower reach being connected with the lower pipe $16^b$ of the longitudinal baffle $A^3$, and the upper reach connected with the upper pipe $16^b$ of said baffle $A^3$. These lateral baffles $A^4$ branch off from the longitudinal baffle $A^3$ at right angles with respect thereto, being extended in the direction of the sidewalls 10. The lower reach of each pipe of each lateral baffle $A^4$ is supplied with a valve 25 for cutting off the flow of the refrigerant therethrough. Hangers $18^c$ depending from the ceiling 12 support the pipe reaches near the outer ends of the lateral baffles, said hangers being constructed similar to the hangers $18^b$ employed in supporting the pipe reaches constituting the longitudinal baffle $A^3$. In this form of the invention, where longitudinal and lateral ceiling baffles are combined, a room is divided into a multiplicity of bays, as defined by said baffles. The general circulation of air in the room is similar to that existing in a room equipped with the form of my invention shown in Fig. 2. The principal features to be noted in connection with the form shown in Figs. 5 and 6 being that the lateral baffles, when in use, as by opening the valves 25, prevent the warm air of a relatively high humidity from flowing longitudinally of the room at the ceiling from one bay to the adjacent bay. With this provision, the circulation of air in the different bays, along the same side of the room, is isolated in the respective bays, whereby the relatively warm air of relatively high humidity over a quantity of fresh and yet unrefrigerated goods, will not pass over into an adjacent bay where refrigerated merchandise is located, and thence descend upon such merchandise with the detrimental effect of creating condensation thereon.

In the form of my invention shown in Figs. 7, 8 and 9, I employ a construction embodying the features residing in the form which is shown in Fig. 4. In addition, is the feature of the lateral baffles of the form shown in Figs. 5 and 6. In further addition to the form shown in Fig. 4, I employ side baffle walls 26 and end baffle walls 27 spaced slightly from the sides and ends respectively of the upper tiers of refrigerant pipes $24^b$. The upper edges of these side baffle walls 26, like the tiers of refrigerant pipes $24^b$, are spaced vertically from the ceiling 12 to provide a passageway $23^b$ between the same and the ceiling, through which air may pass to the central port $22^b$ between the groups of tiers of refrigerant pipes. Projecting inwardly from the lower edges of the sides and end baffle walls 26 and 27 are gutter supports upon which gutters 28 are arranged. These gutters communicate one with the other, one thereof being supplied with a drain pipe, not shown, for the purpose of carrying off condensation which accumulates in said gutters. Beneath each lateral baffle $A^4$ is a conduit or trough 29 open along the upper side thereof beneath the lower reach of the pipe forming said baffle. The outer end of each conduit is closed by an end wall 30, while the open inner end thereof fits within a notch cut in the upper edge of a side baffle wall 26. And each conduit 29 slopes downwardly from the end thereof remote from its respective side baffle wall 26 extending into the space between the side baffle walls 26 wherein the refrigerant pipes $24^b$ are located. Thus, it will be understood that, in the form of my invention shown in Figs. 7, 8 and 9, the lateral baffles $A^4$ perform the same function as explained in connection with Figs. 5 and 6, and that the conduits 29 beneath these baffles, convey the refrigerated air descending therefrom to the proximity of the refrigerant pipes over the central aisle, from which locality a more complete dehumidification of the air is effected and a more active and better defined convective circulation established in descending paths along the center of the room.

It can readily be comprehended that in the use of my invention, as disclosed in Figs. 7, 8 and 9, it is possible to employ alone, for the purpose previously explained, the central longitudinal baffle $A^2$ in the capacity of means for refrigerating and controlling the circulation of air in the room. It will also be understood that the refrigerant pipes $24^b$ can be brought into operation to supplement the refrigerating action of the longitudinal baffle $A^2$; also, that the lateral baffles $A^4$ may be brought into operation selectively, when required, to prevent the intermingling of circuits in adjacent bays of the room at the same side thereof. Thus, it is seen that a room can be readily refrigerated in the degree desired, and that the normally existing natural convective and diffused circulation of air in the circuits at either side of the room may be reliably continued after fresh stocks of relatively warm merchandise has been intermingled with refrigerated goods in the place of previously removed refrigerated merchandise.

In the embodiment of my invention shown in Figs. 10 and 11, as in the form illustrated in Figs. 7, 8 and 9, there is included grouped tiers of pipes $24^c$ supported by hangers $18^c$ fitted with hooks $19^c$ which receive and carry said pipes. Also there is included baffle walls $26^c$ provided with gutters $28^c$, a central port $22^c$ being provided between the tiers of pipes $24^c$ and a passageway $23^c$ between the ceiling 12 and the uppermost of said pipes $24^c$ and the upper edges of the baffle walls $26^c$. A longitudinal baffle $A^5$ composed of reaches of refrigerant piping occupies position in the passageway $23^c$ coextensive with the port $22^c$ medially thereof. Differing, however, from the form shown in Figs. 7, 8 and 9, the lateral baffles $A^4$ of refrigerant piping, illustrated in those figures are omitted and in their stead are solid lateral baffles $A^6$, of sheet metal or, preferably wood. These lateral baffles $A^6$ are arranged at intervals between the ends of the room, each comprising a board 32 extending from a point inside of one of the baffle walls $26^c$ to the nearest side wall 10, the upper edge of said board being positioned against the ceiling 12. Fastened flatwise against the lower edge of each board 32 is a drain strip 33, its upper face being hollowed out slightly at either side of the board 32 to provide gutters 34 for conducting condensation to the gutters $28^c$ at the lower edges of the baffle walls $26^c$. And in this connection, it is to be noted that the drain strips slope downwardly from the sidewalls 10, the inner ends thereof projecting into the space between the baffle walls $26^c$.

These lateral baffles $A^6$ consisting of the boards 32 define a series of bays in the room at either side thereof and form segregated ways from side walls 10 to refrigerant pipes $24^c$. With this construction, the path of least resistance for warm air of relatively high humidity at the ceiling over a quantity of freshly stored goods, is along the ceiling between the baffles $A^6$ defining the bay occupied by such goods and not longitudinally of the room into an adjacent bay where refrigerated lading is located. Thus, it will be understood, that such warm air of relatively high percentage of humidity will travel into the space between the baffle walls $26^c$ and be there refrigerated and dehumidified and properly set upon its way in the desired predetermined circuit instead of entering an area or bay occupied by refrigerated goods and thence descending thereon with the detrimental formation of condensation on such goods.

An important advantage resides in my invention, whereby the refrigeration may be readily controlled as desired, and the natural movement of air, by gravity, effectively confined within predetermined circuits, wherein the air is desirably conditioned and the stored goods protected against damage and deterioration by the accumulation thereon of condensation.

Changes in the specific form of my invention, as herein disclosed, may be made within the scope of what is claimed without departing from the spirit of my invention.

Having described my invention, what I claim as new and desire to protect by Letters Patent is:

1. The combination with a room of a refrigerating and air circulating element forming a baffle spaced from the side walls at and depending from the ceiling of the room, another similar element extending from said first element in a direction toward one of said side walls, and a conduit open at its upper side along its length beneath said latter element and leading toward said first element.

2. The combination with a room of a refrigerating and air circulating element forming a baffle spaced from the side walls and depending from the ceiling of the room, another similar element extending from said first element in the direction of one of said side walls, and a conduit open at its upper side along its length beneath said latter element and leading toward said first element, said conduit being inclined downwardly from the end thereof remote from said first element.

3. The combination with a room of a refrigerating and air circulating element forming a baffle spaced from the side walls and depending from the ceiling of the room, said element comprising two pipes, one above the other for the transmission of a refrigerating fluid, another similar element extending from said first element in the direction of one of said side walls, one end of one pipe of said second element being connected with the corresponding end of the other pipe thereof, the other end of the upper pipe and the other end of the lower pipe being respectively connected with the corresponding pipes of said first element, and a valve in one of the pipes of said second element.

4. The combination with a room of a refrigerating and air circulating element forming a baffle spaced from the side walls and depending from the ceiling of the room, said element comprising two pipes, one above the other, for the transmission of a refrigerating fluid, another element extending from said first element in the direction of one of said side walls, the upper and lower pipes of the second element being respectively connected with the corresponding pipes of the first element.

5. The combination with a room of banks of overhead refrigerating coils extending longitudinally of the room and spaced from the side walls thereof, said banks of coils being spaced apart horizontally to form a central port between them and spaced vertically from the ceiling to provide an air passageway thereover, and a refrigerating element comprising a baffle depending from the ceiling and occupying a position in said passageway in a vertical plane extending through said central port medially thereof.

6. The combination with a room of banks of overhead refrigerating coils extending longitudinally of the room and spaced from the side walls thereof, said banks of coils being spaced apart horizontally to form a central port between them and spaced vertically from the ceiling to provide an air passageway thereover, and an element comprising a baffle depending from the ceiling and occupying a position in said passageway in a vertical plane extending through said central port medially thereof.

7. The combination with a room of overhead refrigerating means extending longitudinally of the room between the side walls thereof, the same being adapted to refrigerate the air and permit of its descent therethrough and being spaced vertically from the ceiling to provide an air passageway thereover, and an element comprising a baffle depending from the ceiling and occupying a position coextensive with said refrigerating means between the sides thereof.

8. The combination with a room of a primary refrigerating and air circulating element providing a longitudinal baffle at the ceiling extending lengthwise of the room, and secondary refrigerating elements providing lateral baffles at the ceiling extending cross-wise of the room and conduits, one for each secondary refrigerating element, each conduit opening at its upper side along its length beneath its respective secondary element and leading toward said primary element.

9. The combination with a room of an overhead refrigerating and air circulating element therein extending longitudinally thereof between the side walls, and non-refrigerating elements constituting lateral imperforate baffles at the ceiling extending cross-wise of the room between the side walls thereof and said refrigerating and air circulating element.

10. The combination with a room of a refrigerating and air circulating element extending overhead longitudinally of the room between the sidewalls thereof, a baffle wall at either side of said element, said baffle walls being spaced at their upper edges from the ceiling, and lateral baffles at the ceiling extending cross-wise of the room between the sidewalls thereof and said baffle walls.

11. The combination with a room of primary refrigerating means extending overhead longitudinally of a room and spaced from the ceiling thereof, vertical baffle walls one at either side of said refrigerating means, both being spaced horizontally from said refrigerating means and spaced vertically from the ceiling, a refrigerating element comprising a baffle depending from the ceiling and occupying a position coextensive with said primary refrigerating means midwidth thereof, other similar refrigerating elements extending from said first element in directions toward the side walls and over the corresponding baffle walls, and a conduit, one for each of said second elements, open along its upper side beneath its respective element, each conduit leading to the space between a baffle wall and the primary refrigerating means.

12. The combination with a room of primary refrigerating means extending overhead longitudinally of the room, a vertical baffle wall spaced from one side of said primary refrigerating means, said baffle wall and refrigerating means being spaced vertically from the ceiling to provide a passageway thereover, a refrigerating element comprising a baffle depending from the ceiling and extending from said baffle wall in a direction toward the corresponding side wall of the room, and a conduit open along its upper side beneath said refrigerating element, the same leading to the space between said primary refrigerating means and baffle wall.

13. The combination with a room of overhead refrigerating and air circulating means extending along the room between opposite walls thereof and spaced vertically from the ceiling, and a baffle, co-extensive with said refrigerating means, forming a medial, vertical partition in the space between said means and ceiling.

14. The combination with a room of an overhead refrigerating and air circulating element therein extending longitudinally thereof between the side walls, a ceiling baffle extending longitudinally of the room above said element, and another ceiling baffle extending laterally from said first ceiling baffle.

In testimony whereof I have affixed my signature to this specification.

CHARLES A. MOORE.